United States Patent
Narasimhan et al.

(10) Patent No.: US 7,231,417 B2
(45) Date of Patent: Jun. 12, 2007

(54) ASSESSMENT ENGINE

(75) Inventors: Ezhilan Narasimhan, Cupertino, CA (US); Patric Chew Pok Chang, Sunnyvale, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 834 days.

(21) Appl. No.: 09/843,495

(22) Filed: Apr. 25, 2001

(65) Prior Publication Data

US 2002/0161857 A1 Oct. 31, 2002

(51) Int. Cl.
*G06F 15/16* (2006.01)

(52) U.S. Cl. .................... 709/203; 709/217; 707/3; 707/10; 705/1; 705/26

(58) Field of Classification Search ............... 709/203, 709/217, 219; 707/1, 3, 5, 10, 104.1; 705/1, 705/26
See application file for complete search history.

(56) References Cited

U.S. PATENT DOCUMENTS

| | | | | |
|---|---|---|---|---|
| 4,648,044 A | * | 3/1987 | Hardy et al. ............... 706/60 |
| 5,012,430 A | * | 4/1991 | Sakurai ...................... 700/50 |
| 5,596,752 A | * | 1/1997 | Knudsen et al. ........... 717/117 |
| 5,732,400 A | * | 3/1998 | Mandler et al. ............. 705/26 |
| 5,889,953 A | * | 3/1999 | Thebaut et al. ............ 709/221 |
| 6,560,592 B1 | * | 5/2003 | Reid et al. .................... 707/2 |
| 6,598,036 B1 | * | 7/2003 | Wang et al. ................. 706/61 |
| 6,604,141 B1 | * | 8/2003 | Ventura ..................... 709/227 |
| 6,615,226 B1 | * | 9/2003 | Hartman et al. ............ 715/505 |
| 6,651,054 B1 | * | 11/2003 | de Judicibus ................. 707/3 |
| 2002/0046053 A1 | * | 4/2002 | Hare et al. ..................... 705/1 |
| 2003/0055664 A1 | * | 3/2003 | Suri ............................... 705/1 |

* cited by examiner

*Primary Examiner*—Ario Etienne
*Assistant Examiner*—LaShonda Jacobs
(74) *Attorney, Agent, or Firm*—Park, Vaughan & Fleming LLP (57) ABSTRACT

A method of generating a function, the function for assessing a parameter. The method includes: displaying a field for receiving a rule on a computer; entering a rule into the computer; transmitting the rule to a server; storing the rule on the server; and generating a function for assessing the parameter.

19 Claims, 8 Drawing Sheets

Figure 1

Assessment Engine

Enter Parameter Name:

Enter Parameter Type:

Enter Rule:

*Figure 2*

Assessment Engine

Enter Parameter Name: | Automobile Color |

Enter Parameter Type: | String |

Edit Rule: | if automobile color = 'red' then value = 100 |

*Figure 3*

Assessment Engine

Enter Automobile Color: [red]

Enter Automobile Horsepower: [250]

Enter Automobile Condition: [good]

Enter Automobile Milage: [50,000]

Automobile Assessment: [ ]

*Figure 4*

Assessment Engine

Enter Automobile Color: red

Enter Automobile Horsepower: 250

Enter Automobile Condition: good

Enter Automobile Milage: 50,000

Automobile Assessment: 325

*Figure 5*

Assessment Engine

Select Automobile Color: ● red ○ green ○ white

Enter Automobile Horsepower: 250

Enter Automobile Condition: good

Enter Automobile Milage: 50,000

Automobile Assessment: 325

ASSESSMENT ENGINE

FIELD OF THE INVENTION

The present invention generally relates to assessing one or more parameters via an assessment engine. More specifically, the present invention relates to an assessment engine that generates functions for the assessment of one or more parameters.

BACKGROUND

Many people have the need to make accurate assessments. A person may wish to purchase an automobile that has a specific color, engine size, condition, and mileage. However, choosing the "best" automobile may be difficult because of the large number of automobiles that are available for purchase. The person may also need to evaluate a number of employees based upon a large number of parameters. Such evaluations can be difficult and extremely laborious. Further, the person may need to evaluate which of a number of potential customers that he should spend limited marketing dollars upon. Making such a determination can be very challenging.

Thus, there is a need for a tool that will enable a user to rapidly make accurate assessments such as those discussed above.

SUMMARY OF INVENTION

One embodiment of the invention is a method of generating a function, the function for assessing a parameter. The method includes: displaying a field for receiving a rule on a computer; entering a rule into the computer; transmitting the rule to a server; storing the rule on the server; and generating a function for assessing the parameter.

Another embodiment of the invention is a program storage device containing instructions that when executed by a computer perform the following acts: display a field for receiving a rule; transmit a rule to a server; display a field for receiving a parameter; and display an assessment.

Another embodiment of the invention is a program storage device containing instructions that when executed by a server perform the following acts: receive a rule from the computer; and generate a function for assessing a parameter.

Still another embodiment of the invention is a method of displaying an assessment on a computer. The method includes: displaying a field for receiving a parameter name on a computer; entering a parameter name into the computer; displaying a field for receiving a parameter type on the computer; entering a parameter type into the computer; displaying a field for receiving a rule on a computer; entering a rule into the computer; transmitting the parameter name, the parameter type and the rule to a server; storing the parameter name, the parameter type and the rule on the server; generating a function for assessing a parameter; verifying that the function is valid; if the function is not valid, then displaying a screen on the computer that allows editing of the rule; displaying a field for receiving a parameter; entering a parameter into the computer; transmitting the parameter to the server; generating an assessment of the parameter; transmitting the assessment from the server to the computer; and displaying the assessment on the computer.

DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
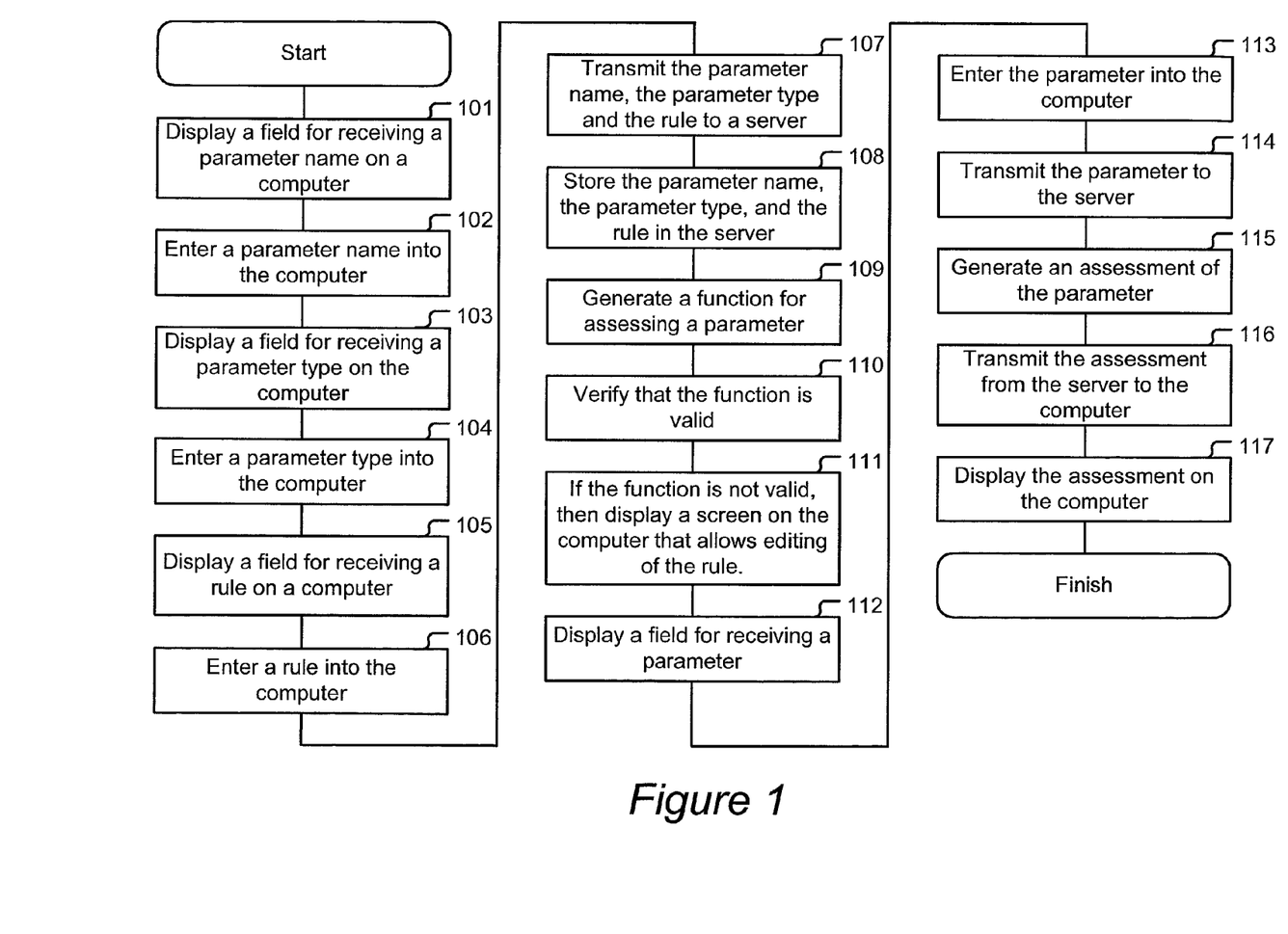
FIG. 1 presents a flow chart of one method of displaying an assessment.

FIG. 1 presents a flowchart of a method of displaying an assessment. This method is easy to use by a non-technical individual. In addition, the method provides the individual with an extremely powerful engine for assessing one or more parameters. Generally, the method allows a computer user to easily enter parameter information and a criterion for assessing one or more parameters. After entering such information, the user may then enter a number of parameters and the method will rapidly generate accurate assessments.

5.1 Entering a Parameter Name

Figure 2:
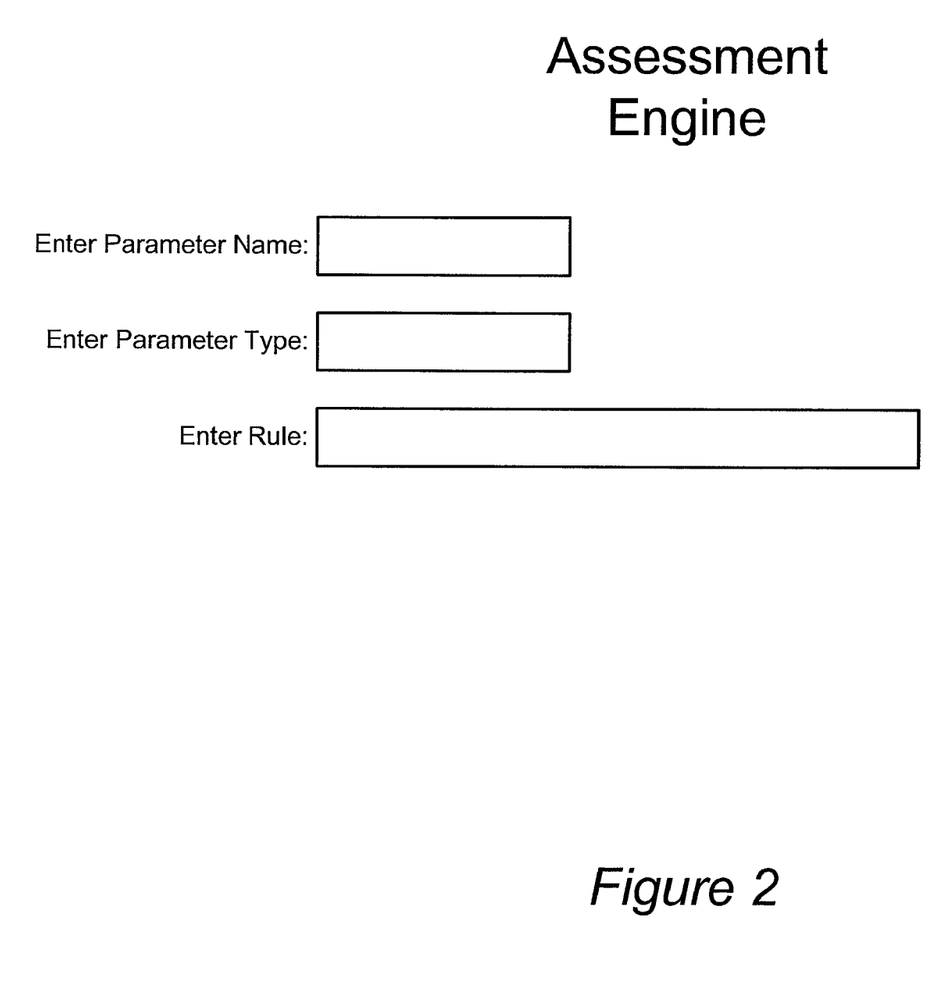
FIG. 2 presents a computer display, i.e., a "screen," that contains fields for receiving a parameter name, a parameter type, and a rule.

As shown in block 101 of FIG. 1, a computer program running on a computer first displays a computer display, i.e., a "screen," that contains a field for receiving a parameter name. An example of such a screen is shown in FIG. 2. The parameter name is utilized to identify a particular parameter. The parameter name can be any combination of alpha/numeric characters. Examples of parameter names include: "Automobile color," "Automobile horsepower," "Automobile condition," and Automobile mileage." Referring to block 102, after the computer program has displayed the screen, the user would then enter the parameter name into the computer. If the computer program is being run on a hand-held computer, then the user may enter the parameter name via a stylus. Alternatively, if the computer program is being run on a laptop or desktop computer, then the user may enter the parameter name via a keyboard, via mouse clicks or via voice recognition software.

5.2 Entering a Parameter Type

Referring to block 103, the computer program would next display a screen with a field for receiving a parameter type on the computer. The parameter type indicates whether the parameter is a numeric parameter, such as 1, 2, −3.5, and 3.141, or a string parameter, such as "red," "green," and "white," or another type of parameter.

In some embodiments of the invention, the screen that contains the field for receiving the parameter type is the same screen that contains the field for receiving the parameter name. In other embodiments of the invention, the screen that contains the field for receiving the parameter name would be distinct from the screen that contains the field for receiving the parameter type.

Referring to block 104, after the field for receiving the parameter type is displayed, the user would then enter the parameter type into the computer. As discussed above, the parameter type may be entered by numerous means.

5.3 Entering a Rule

After the user has entered the parameter name and the parameter type into the computer, as shown in block 105, the computer program displays a screen that contains a field for receiving a rule. As will be discussed in more detail below, the rule indicates the value that a user places upon a particular parameter. In some embodiments of the invention, the screen that contains the field for receiving the rule is the same screen that contains the field for receiving the parameter type. In other embodiments of the invention, the screen that contains the field for receiving the rule would be distinct from the screen that contains the field for receiving the parameter type.

Referring to block 106, after the screen that contains a field for receiving the rule has been displayed, the user enters a rule into the computer. As briefly discussed above, the rule indicates the value that a user places upon a particular parameter. For example, a rule, such as "if automobile color='red' then value=100," indicates that a user places a value of 100 in his assessment if an automobile color is red. A more complex rule such as "if automobile color='red' then value=100; if automobile color='green' then value=50; if automobile color='white' then value=10;" can indicate the value that a user places upon various automobile colors. Other rules such as "value=0.5*automobile horsepower" or "if automobile horsepower>200 then value=100" could indicate the value that a user places upon automobile horsepower.

In some embodiments of the invention, the user may enter a rule in a particular computer language such as Basic, Virtual Basic, Pascal, Fortran, Java, C, C++, Cobol, or PL/SQL. However, in other embodiments of the invention, the rule may be entered in a more simplistic format such as shown above.

5.4 Transmitting Information to a Server

After the parameter name, the parameter type, and the rule have been entered into the computer, as shown in block 107, they are transmitted to a server. In some embodiments of the invention, they are transmitted over the Internet, a wide area network, or a wireless network. In other embodiments of the invention, they are transmitted over an intranet or a local area network.

After the server has received the parameter name, the parameter type, and the rule, as shown in block 108, they are stored on the server. In some embodiments of the invention they are stored in one or more database tables. In other embodiments of the invention they are stored in random access memory or a file, such as a flat file.

5.5 Generating a Function

After the server has received and stored the parameter name, the parameter type, and the rule, as shown in block 109, the server then generates a function for assessing the parameter. For example, if the server received a parameter name such as "automobile color" and received a parameter type such as "string" and received a rule such as "if automobile color='red' then value=100," then the server may generate the following PL/SQL function:

function automobile_color
(parameter_value<DATATYPE>) return NUMBER
as
begin
    if parameter_value like '%red%' then return 100;
end;

While the above function is in PL/SQL, other embodiments of the invention would generate functions in other languages such as Basic, Virtual Basic, Pascal, Fortran, Java, C, C++, or Cobol.

5.6 Verifying the Function is Valid

Figure 3:
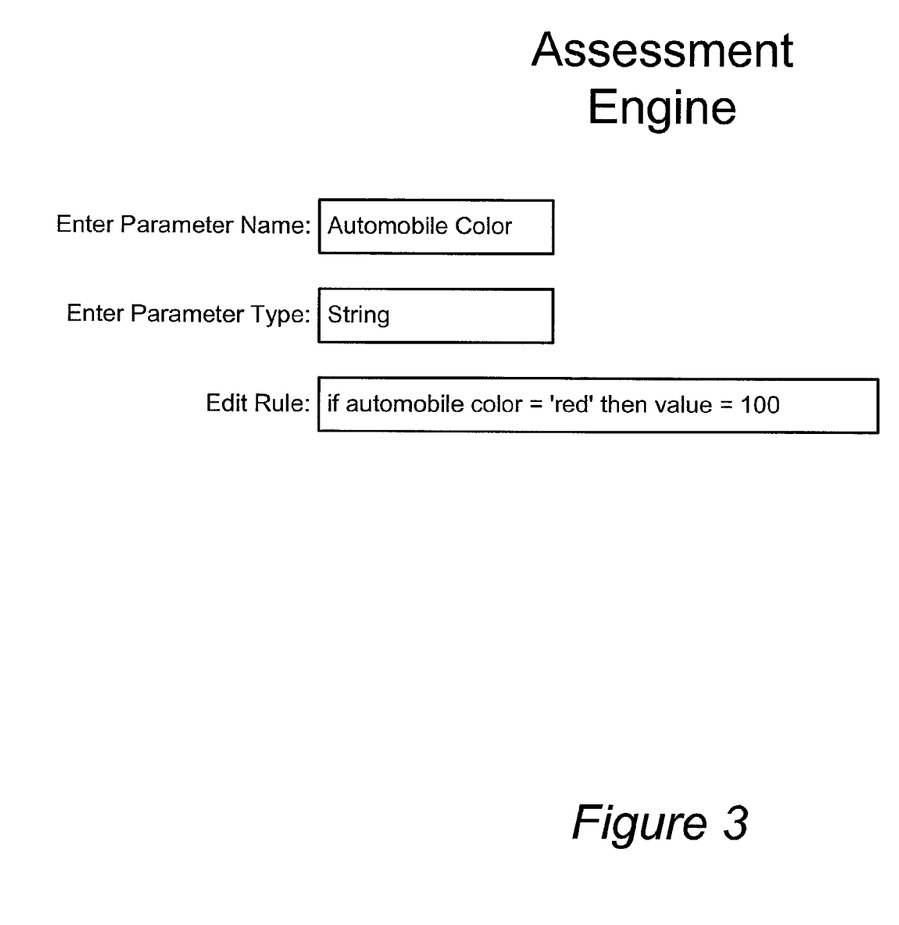
FIG. 3 presents a screen that contains a field for editing a rule.

Referring to block 110, the server next verifies that the function is valid. In one embodiment of the invention, the function is run through a syntax checker to determine if the function is valid. In another embodiment of the invention, the function is compiled. If no errors were generated during the compilation, then the function is considered to be valid. Alternatively, if compiling the function generated an error, then, as shown in block 111, a screen will be displayed on the computer that allows the rule to be edited. An example of such a screen is shown in FIG. 3. Some embodiments of the invention (not shown) also display context sensitive help regarding any errors in the user's rule that cause the function to be invalid.

After the function has been determined to be valid, then the user can begin assessing various parameters.

5.7 Assessing Parameters

Figure 4:
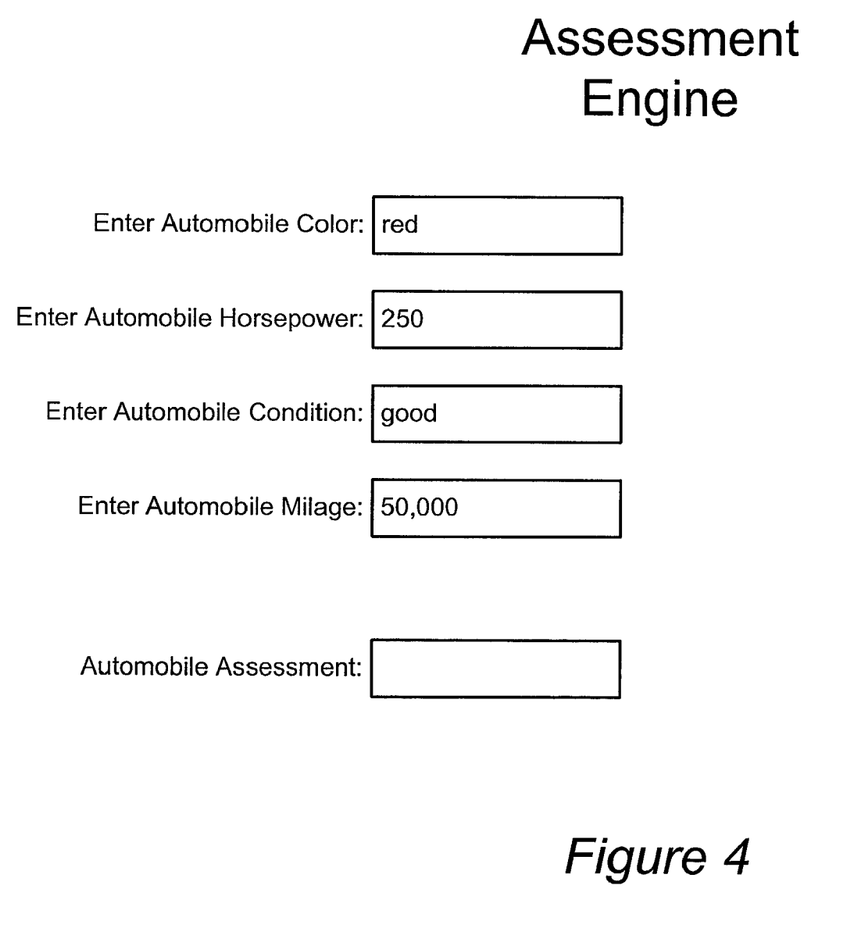
FIG. 4 presents a screen that contains fields for receiving one or more parameters.

Next, as shown in block 112, the computer displays a screen that contains a field for receiving a parameter. An example of such a screen is shown in FIG. 4. In some embodiments of the invention, such as shown in FIG. 4, the screen would include the parameter name adjacent to the field for receiving the parameter. Next, as shown in block 113, the user enters a parameter into the computer. For example, the user may enter the parameter 'red.' Then, as shown in block 114, the computer transmits the parameter to the server. In some embodiments of the invention, the parameter is transmitted over the Internet, a wide area network, or a wireless network. In other embodiments of the invention the parameter is transmitted over an intranet or a local area network.

After the server receives the parameter, as shown in block 115, the server executes the previously generated function, and generates an assessment of the parameter. For example, if the server received the parameter 'red,' and the server executed the function of Section 5.5, then the server would generate an assessment equal to 100.

Figure 5:
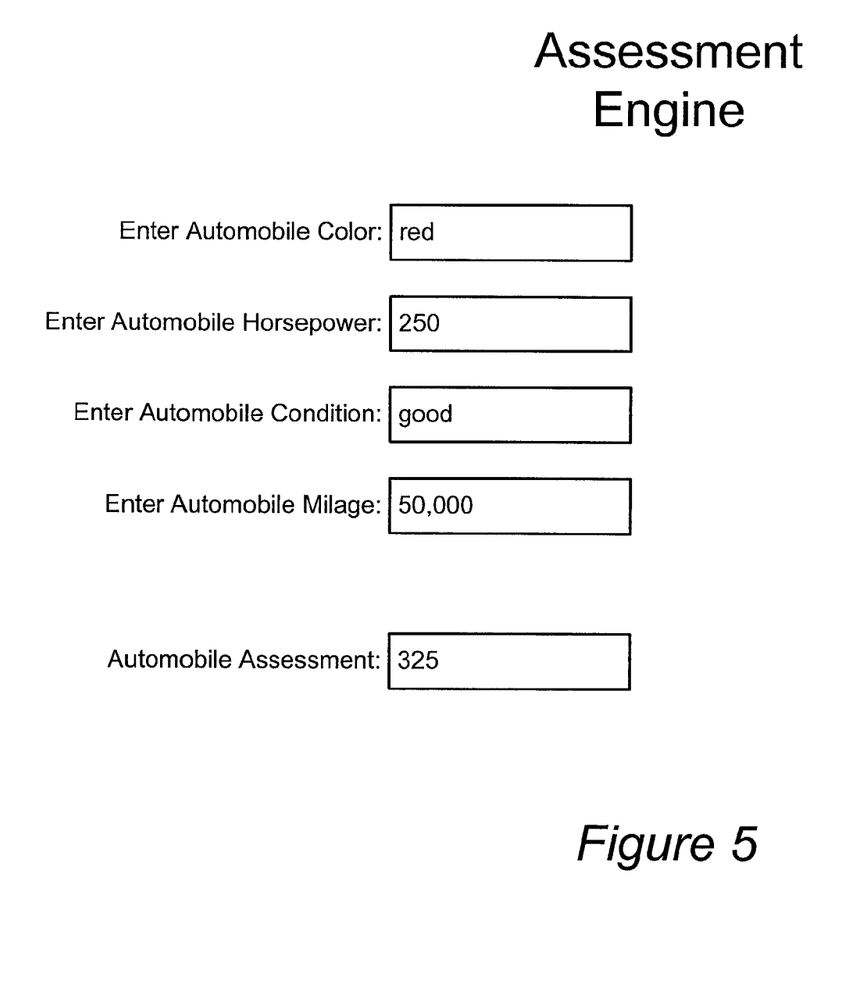
FIG. 5 presents a screen that displays an assessment.

Next, as shown in block 116, the server would transmit the assessment to the computer. Then, as shown in block 117, the computer would display the assessment. An example of a screen that displays such an assessment is shown in FIG. 5.

5.8 Other Embodiments of the Invention

In some embodiments of the invention, the user would enter various data such as parameter names, parameter types, rules, and parameters into a computer via a browser that is running on the computer. In addition, in such embodiments of the invention the assessment could also be displayed on the computer via a browser.

In some embodiments of the invention, numerous parameters can be utilized to generate an assessment. For example, an assessment may be generated by summing the output values of functions that are generated from the following rules: "if automobile color='red' then value=100," "value=0.5*automobile horsepower," "if mileage<100,000 then value=(100,000−mileage)/1000," "if automobile condition='good' then value=50," "if automobile condition='excellent' then value=100."

Figure 6:
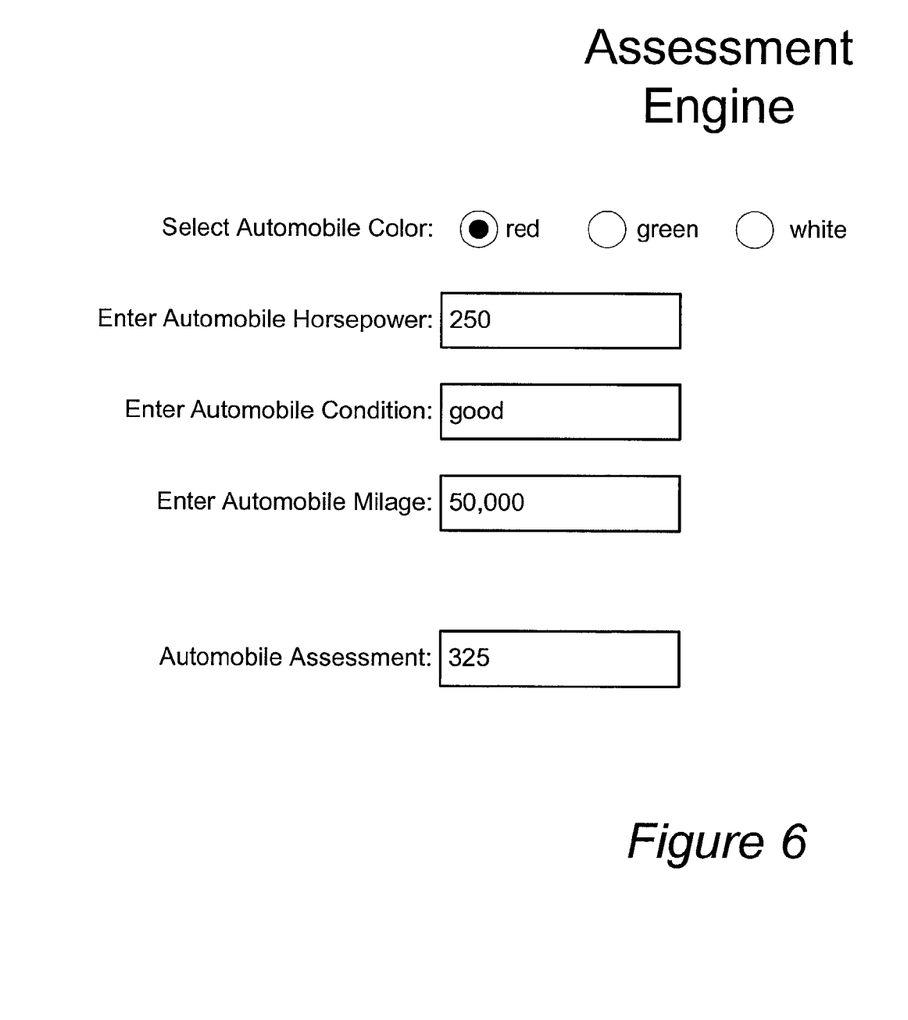
FIG. 6 presents a screen that allows selection of a parameter.

In still other embodiments of the invention, if a user enters a parameter type that indicates that the parameter is a string, then the computer would display a screen (not shown) that contains fields for receiving valid strings such as 'red,' 'green,' and 'white.' Thus, when the user is making an assessment, the computer would include the valid strings on the screen for receiving the parameter. For example, as shown in FIG. 6, the computer could display a screen that contains radio buttons next to each of the following valid strings: 'red,' 'green,' and 'white.' Thus, a user need not manually enter the parameter. Instead, the user need only select the radio button next to the appropriate parameter.

In the embodiments discussed above, the user inputs information manually into the computer. In other embodiments, the computer program would read such information from a file or from a website such as an automobile vendor website, an auction website, or reverse auction website. In other embodiments, the computer program would read such information from the server. In such embodiments, the computer program need not display fields for receiving such information.

In some embodiments of the invention, a first computer may be utilized to enter parameter names, parameter types and/or rules while a second computer is utilized to enter parameters and display assessments. Similarly, a first server may be utilized to generate functions while a second server may be utilized to generate assessments of one or more parameters.

5.9 Benefits of Certain Embodiments of the Invention

Embodiments of the invention provide a user with little technical experience the ability to easily perform assessments of one or more parameters. Such assessments are possible even if the user has no computer programming skills. Thus, the user can rapidly make accurate assessments.

Embodiments of the invention also allow a user to rapidly generate custom assessments. Thus, the user can generate an automobile purchase assessment, an employee assessment, and then a marketing assessment in rapid succession. Because the above described assessment engine is flexible, the user is not required to utilize separate tools to perform such assessments. Instead, the user can perform such assessments with a single tool, namely an embodiment of the above described assessment engine.

5.10 Conclusion

Figure 7:
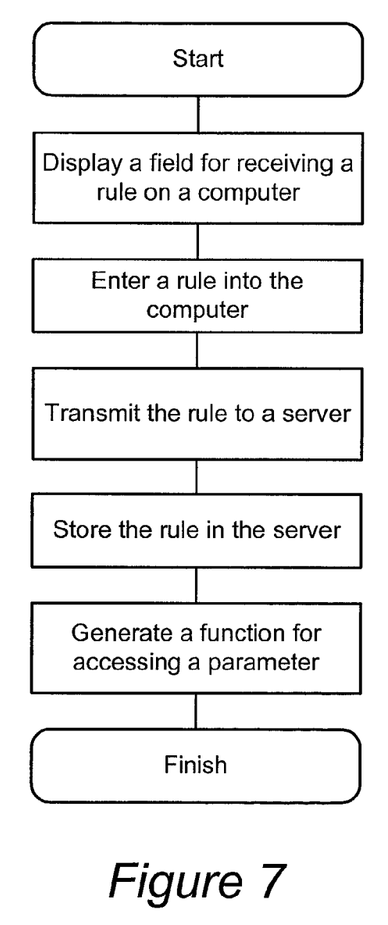
FIG. 7 presents a flow chart of another embodiment of the invention.
Figure 8:
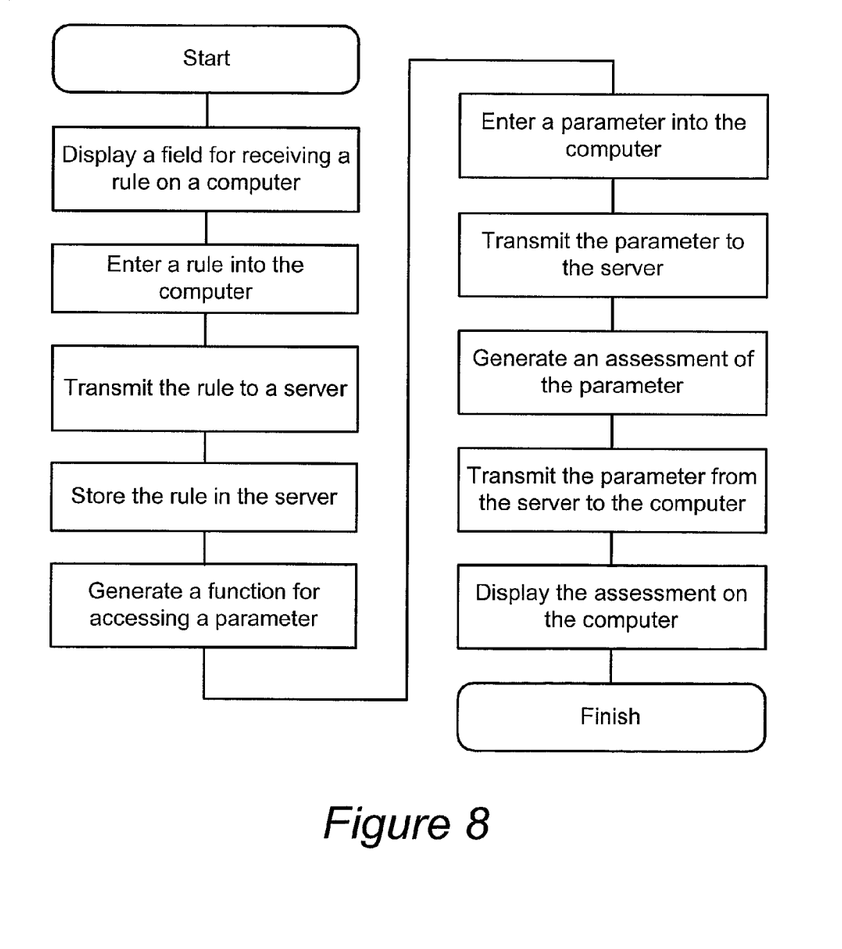
FIG. 8 presents a flow chart of still another embodiment of the invention.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, other embodiments of the invention are shown in FIG. 7 and FIG. 8. In addition, still other embodiments of the invention include a program storage device, such as a hard disk, a floppy disk, a compact disk (CD), a digital versatile disk (DVD), a digital tape, random access memory (RAM), or read only memory (ROM), that contain computer readable instructions that when executed perform the methods discussed above. Further, the above disclosure is not intended to limit the present invention. The scope of the present invention is defined by the appended claims.

It is claimed:

1. A method of generating a function, the method comprising:
   a) displaying a field on a client computer for receiving a rule that is to be input into the client computer by a user of the client computer;
   b) then receiving by the client computer a rule that was input into the client computer by the user of the client computer, the rule defining a premise and a conclusion to be drawn if the premise is true;
   c) then transmitting the rule from the client computer to a server;
   d) then storing the rule on the server; and
   e) then generating a function from the rule at the server that determines if the premise is true and based at least in part upon the conclusion, outputting a first value if the premise is true and outputting a second value if the premise is false;
   f) then receiving a parameter that was entered into the client computer by the user of the client computer;
   g) then transmitting the parameter from the client computer to the server;
   h) then executing the function at the server thereby determining, by the server, if the premise is true or if the premise is false; and
   i) then transmitting the first value from the server to the client computer if the premise is true, otherwise transmitting the second value from the server to the client computer.

2. The method of claim 1, wherein the act of receiving the rule includes receiving the rule by a browser running on the client computer.

3. The method of claim 1, wherein the act of receiving the rule includes receiving a Java equation.

4. The method of claim 1, wherein the act of receiving the rule includes receiving a PL/SQL equation.

5. The method of claim 1, wherein the act of receiving the rule includes receiving a Basic equation.

6. The method of claim 1, wherein the act of receiving the rule includes receiving a Virtual Basic equation.

7. The method of claim 1, wherein the act of transmitting the rule to the server includes transmitting the rule over the Internet.

8. The method of claim 1, wherein the act of generating the function includes generating a Java function.

9. The method of claim 1, wherein the act of generating the function includes generating a PL/SQL function.

10. The method of claim 1, wherein the act of generating the function includes generating a Basic function.

11. The method of claim 1 further comprising: verifying that the function is valid.

12. The method of claim 11, wherein the act of verifying that the function is valid includes running the function through a syntax checker.

13. The method of claim 11, wherein the act of verifying that the function is valid includes compiling the function and determining if the function compiled without generating an error.

14. The method of claim 11, wherein the act of verifying that the function is valid includes compiling the function, determining if compiling the function generated an error, and if compiling the function generated an error, then displaying a screen on the client computer that allows editing of the rule.

15. The method of claim 1 further comprising:
   displaying either the first value or the second value on the client computer.

16. The method of claim 1, wherein the act of receiving the parameter includes receiving the parameter by a browser.

17. The method of claim 1, wherein the act of transmitting the parameter to the server includes transmitting the parameter over the Internet.

18. The method of claim 1, wherein the method further includes executing the function.

19. The method of claim 1, wherein the act of transmitting the first value includes transmitting the first value over the Internet.

\* \* \* \* \*